United States Patent

[11] 3,618,012

| [72] | Inventor | Eric Shaw<br>Birmingham, England |
|---|---|---|
| [21] | Appl. No. | 805,661 |
| [22] | Filed | Mar. 10, 1969 |
| [45] | Patented | Nov. 2, 1971 |
| [73] | Assignee | Joseph Lucas (Industries) Limited<br>Birmingham, England |
| [32] | Priority | Mar. 11, 1968 |
| [33] | | Great Britain |
| [31] | | 11,691/68 |

[54] DIRECTION INDICATOR SYSTEMS FOR ROAD VEHICLES
1 Claim, 4 Drawing Figs.

[52] U.S. Cl. .................................................. 340/81 F
[51] Int. Cl. .................................................. B60q 1/38
[50] Field of Search .......................................... 340/55, 67, 73, 81

[56] References Cited
UNITED STATES PATENTS

| 2,203,502 | 6/1940 | Michel | 340/76 |
| 2,787,779 | 4/1957 | Hollins | 340/81 F |
| 2,859,382 | 11/1958 | Ellithorpe | 340/55 UX |
| 3,185,961 | 5/1965 | DaRocher | 340/81 F |
| 3,244,934 | 4/1966 | Webb | 340/67 X |
| 3,304,381 | 2/1967 | McAnespey | 340/71 UX |
| 3,340,503 | 9/1967 | Johnston et al. | 340/81 |
| 3,372,373 | 3/1968 | Heidman | 340/74 |
| 3,478,312 | 11/1969 | Lee | 340/67 |

*Primary Examiner*—John W. Caldwell
*Assistant Examiner*—Kenneth N. Leimer
*Attorney*—Holman & Stern ABSTRACT: In a direction indicator system for a road vehicle a first flasher unit operates the direction indicator lamp through a direction indicator switch in the usual way, but a control switch is included in the circuit. This control switch has a normal position in which it does not affect the system at all, but an emergency position in which it breaks the circuit to the direction indicator switch and also completes a circuit including a second flasher unit and a relay. The second flasher unit then operates all the flasher lamps simultaneously through the relay to give the emergency signal.

DIRECTION INDICATOR SYSTEMS FOR ROAD VEHICLES

This invention relates to direction indicator systems for road vehicles.

A direction indicator system according to the invention comprises a first flasher unit which operates through a direction indicator switch to actuate direction indicator lamps at one side or the other of a road vehicle, and a control switch having a normal position in which it completes the circuit to the direction indicator switch by way of the first flasher unit, and an emergency position in which it breaks the circuit to the direction indicator switch, but completes a circuit including the battery of the vehicle, a second flasher unit and a relay, the relay acting under the control of the second flasher unit to operate all the direction indicator lamps of the vehicle simultaneously.

In the accompanying drawings, FIGS. 1 to 4 are circuit diagrams illustrating four examples of the invention.

Figure 1:
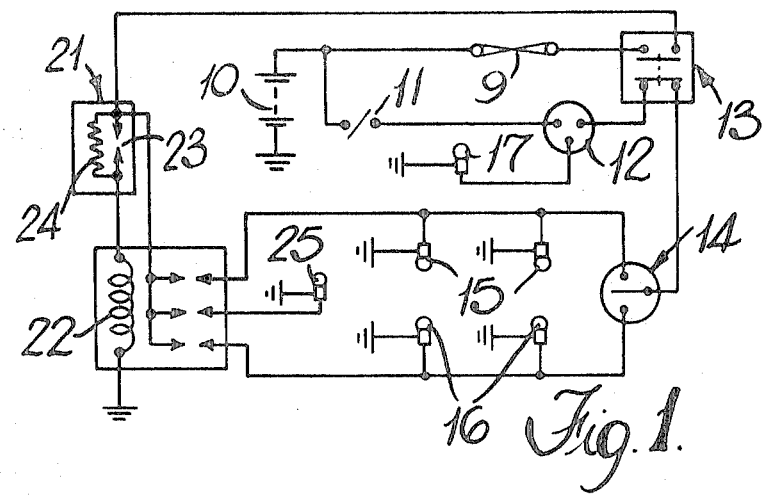

Referring to FIG. 1, the battery 10 of the vehicle has one terminal earthed, and its other terminal connected through the ignition switch 11 of the vehicle to a flasher unit 12. The unit 12 is connected through a switch 13 to the normal direction indicator switch 14, which can be actuated to operate the left-hand direction indicator lamps 15 or the right-hand direction indicator lamps 16 of the vehicle. A warning lamp 17 is associated with the unit 12 in the usual way to indicate that the lamps are operating.

In the normal operation, the switch 13 completes the circuit from the unit 12 to the switch 14 as shown, and the direction indicator lamps are operated by the driver of the vehicle as desired. However, in the event of an emergency, for example a break down on a motorway, the driver moves the switch 13 from its normal position to its emergency position, in which the circuit between the unit 12 and the switch 14 is broken but a circuit is completed direct from the battery through a fuse 9, the switch 13, a second flasher unit 21, and a relay 22. The unit 21 is a conventional unit including a pair of contacts 23 bridged by a resistance coil 24, and the arrangement is such that initially the current flowing through the resistor 24 and the relay 22 is insufficient to energize the relay. However, as the resistor 24 heats up, the contacts 23 close to complete a circuit to the relay to energize the relay. When a relay is energized, its three sets of normally open contacts close to energize respectively the lamps 15, the lamps 16 and a warning light 25. As soon as the contacts 23 close, the current through the resistor 24 is bypassed, so that the resistor 24 cools down and the contacts 23 open, so deenergizing the relay 22, the lamps 15, 16, and 25 are now extinguished, and the cycle is repeated. Thus, with the switch 13 in its emergency position all the indicator lamps are flashed simultaneously. It will be appreciated that since the flasher unit 21 operates the lamps through the intermediary of the relay 22, the unit 21 can have the same rating as the unit 12 and still operate the lamps at the nominal frequency of the unit 12.

Figure 2:
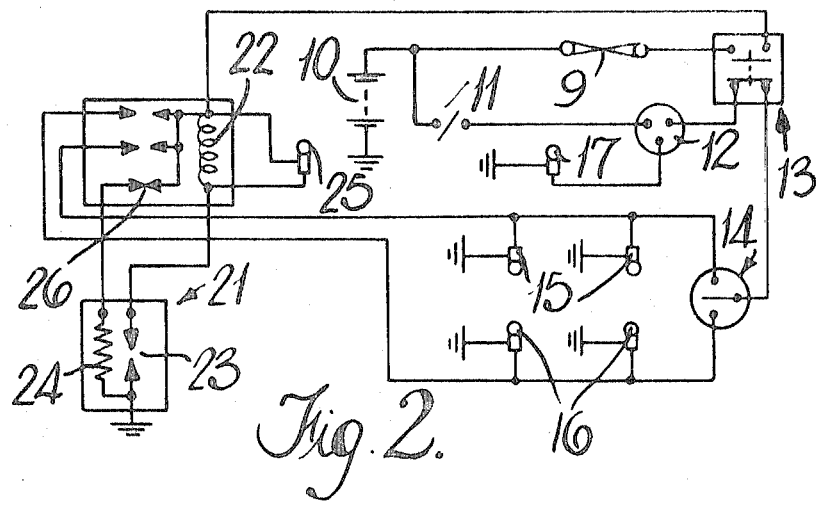
Figure 3:
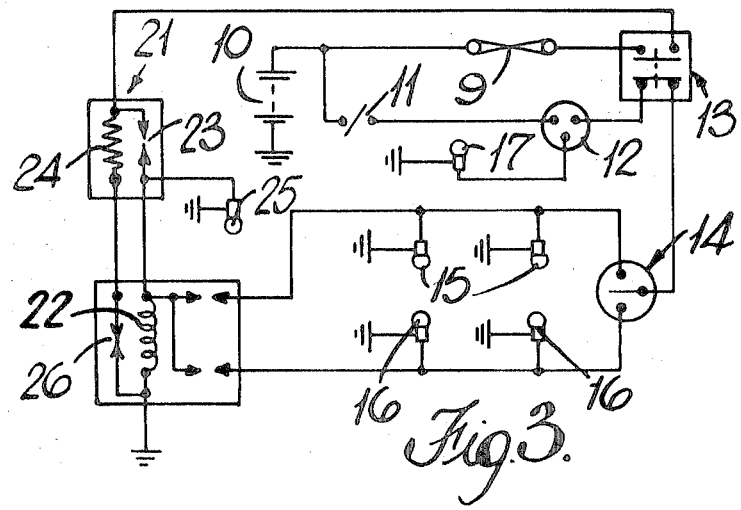

In the arrangement shown in FIG. 2, the positions of the relay and the unit 21 are reversed, and separate connections are made to the contacts 23 and the resistor 24, the connection to the contacts 23 being through the relay coil 22, and the connections to the resistor 24 being through a pair of normally closed contacts 26 operated by the relay coil. The arrangement is such that when the switch 13 is in its emergency position, no current initially flows through the coil 22, but current flows through the contacts 26 to heat the resistor 24, which in turn closes the contacts 23 to complete the circuit to the relay coil 22. The resistor 24 is then open-circuited and cools down, and the cycle is repeated as in FIG. 1. The lamp 25 in this example is connected across the coil 22. A circuit operating in a similar manner but with the parts slightly rearranged is shown in FIG. 3. The circuit is again completed through resistor 24 and the contacts 26, closing the contacts 23 completing the circuit to the relay coil 22.

Figure 4:
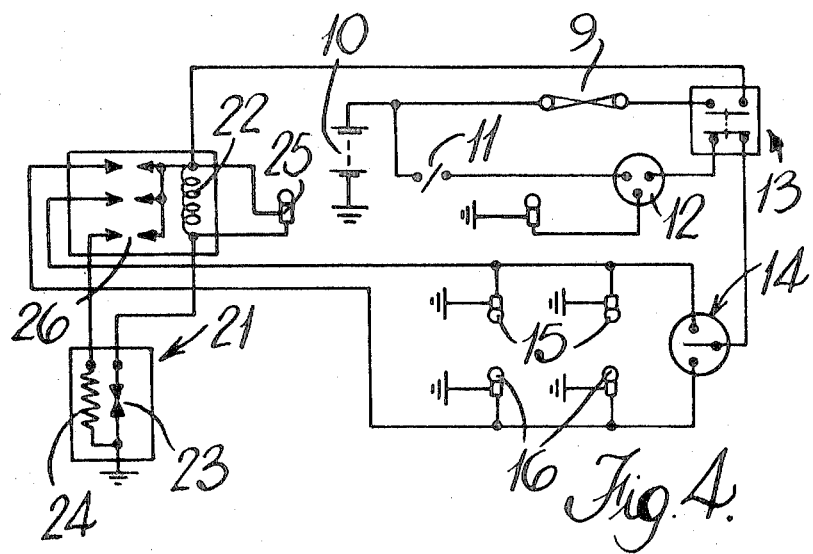

The example shown in FIG. 4 is similar to that shown in FIG. 2, except that the contacts 23 of the unit 21 are normally closed, and the contacts 26 of the relay are normally open. When the switch 13 is in its emergency position, current flows through the relay coil 22 and the contacts 23, and the energization of the coil 22 illuminates the indicator lamps and at the same time closes the contacts 26 so that the resistor 24 becomes heated, and opens the contacts 23, so breaking the circuit to the coil 22, so that the contacts 26 open, the direction indicator lamps are extinguished, and the cycle is repeated.

Having thus described my invention, what I claim as new and desire to secure by Letter Patent is:

1. A direction indicator system for a road vehicle, comprising in combination a battery having a first terminal and a second terminal which is grounded, a direction indicator switch having a movable contact and a pair of fixed contacts, left-hand and right-hand direction indicator lamps through which said pair of fixed contacts are grounded respectively, a circuit connecting said movable contact of the direction indicator switch to the first battery terminal, said circuit including a normally closed contact of an emergency switch and a first flasher unit, said emergency switch having in addition to said normally closed first contact, a normally open second contact, and said emergency switch when operated serving to open said normally closed contact to break the circuit to the direction indicator switch, and to close the normally open contact and complete a circuit across said battery incorporating the normally open contact of the emergency switch, a second flasher unit and a relay, said second flasher unit having the same rating as said first flasher unit, and said relay incorporating contact means connecting the left-hand and right-hand direction indicator lamps to the battery.

* * * * *